US012703424B2

(12) United States Patent
Shah et al.

(10) Patent No.: US 12,703,424 B2
(45) Date of Patent: Aug. 11, 2026

(54) CONTROLLING STEER-BY-WIRE STEERING APPARATUS

(71) Applicant: ZF Automotive UK Limited, Solihull (GB)

(72) Inventors: Mansoor Shah, Derby (GB); Jon Chalmers, Warwick (GB)

(73) Assignee: ZF Automotive UK Limited, Solihull (GB)

(*) Notice: Subject to any disclaimer, the term of this patent is extended or adjusted under 35 U.S.C. 154(b) by 181 days.

(21) Appl. No.: 18/611,858

(22) Filed: Mar. 21, 2024

(65) Prior Publication Data

US 2024/0317306 A1 Sep. 26, 2024

(30) Foreign Application Priority Data

Mar. 21, 2023 (GB) .................................... 2304134

(51) Int. Cl.
*B62D 6/00* (2006.01)
*B62D 5/04* (2006.01)

(52) U.S. Cl.
CPC .......... *B62D 6/008* (2013.01); *B62D 5/0484* (2013.01); *B62D 5/0493* (2013.01)

(58) Field of Classification Search
CPC ..... B62D 6/008; B62D 5/0484; B62D 5/0493
(Continued)

(56) References Cited

U.S. PATENT DOCUMENTS 12,179,856 B2 * 12/2024 Washnock .......... B62D 5/0406
2015/0284010 A1 * 10/2015 Beardsley ............... G08G 5/57 701/1

(Continued)

FOREIGN PATENT DOCUMENTS

CN 208165094 U 11/2018
CN 117885661 A 4/2024

*Primary Examiner* — Logan M Kraft
*Assistant Examiner* — John D Bailey
(74) *Attorney, Agent, or Firm* — Kristin L. Murphy

(57) ABSTRACT

A microprocessor system for a vehicle steer-by-wire steering apparatus, comprising: a hand wheel actuator controller, comprising first and second microprocessors, and arranged to provide control signals for a hand wheel actuator of the steering apparatus; a front axle actuator controller, comprising first and second microprocessors, and arranged to provide control signals for a front axle actuator of the steering apparatus; first and second private buses connecting the first microprocessor of the hand wheel actuator controller to the first microprocessor of the front axle actuator controller. The first private bus has a physical layer over which data can be transmitted with a first data link format and a second data link format different to the first data link layer format. The second private bus connects the second microprocessor of the hand wheel actuator controller to the second microprocessor of the front axle actuator controller. The second private bus comprises a physical layer over which data can be transmitted with either the first or second data link format. The microprocessor system is arranged to switch from the first state to the second state upon one of the first or second microprocessors of the hand wheel actuator controller or the front axle actuator controller determining that there is a fault on the first or second private bus.

17 Claims, 2 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2019/0009813 | A1* | 1/2019 | Siskoy | B62D 5/0484 |
| 2019/0143965 | A1* | 5/2019 | Driscoll | G05D 1/0022 701/41 |
| 2020/0062293 | A1* | 2/2020 | Yeom | B62D 15/021 |
| 2020/0382040 | A1* | 12/2020 | Suzuki | B62D 5/0493 |
| 2021/0046972 | A1* | 2/2021 | Fujita | B62D 6/008 |
| 2021/0206427 | A1* | 7/2021 | Balogh | B62D 5/046 |
| 2022/0289282 | A1* | 9/2022 | Narasimhan | B62D 5/001 |
| 2022/0340199 | A1* | 10/2022 | Yeon | B62D 6/008 |
| 2023/0182807 | A1* | 6/2023 | Yang | B62D 15/027 701/41 |
| 2024/0147577 | A1* | 5/2024 | Forde | H04L 12/4633 |

* cited by examiner

HWA - LANE A
HWA - LANE B
FAA - LANE B
FAA - LANE B
Micro
Flex Ray
Flex Ray Txcr
UART (ASCLIN)
UART
CAN
CAN Txcr
Normal path, CAN DLL + CAN Physical layer
Prior Art
1
2
3
4
5
6
7
8
9
10
11
12
13
14
15
16
17
18
19
20

102
101
103
106
104
105
117
118
119
120
HWA
FAA
Micro
Flex Ray
Flex Ray Txcr
UART (ASCLIN)
CAN
UART
CAN Txcr
CAN TVRA
CAN TVRB
Alternate path, UART DLL + CAN Physical layer
PRIMARY path, CAN DLL + CAN Physical layer
Alternate path, CAN DLL + CAN Physical layer
PRIMARY path, UART DLL + CAN Physical layer
107
108
109
110
111
112
113
114
115
116
121
122
123

CONTROLLING STEER-BY-WIRE STEERING APPARATUS

CROSS-REFERENCE TO RELATED APPLICATION

This application claims priority to GB Priority Application No. 2304134.6, filed Mar. 21, 2023, the disclosure of which is incorporated herein by reference in its entirety.

TECHNICAL FIELD

This disclosure relates to a microprocessor system for a steer-by-wire steering apparatus, an actuator controller for a steer-by-wire steering apparatus and a method of operating a steer-by-wire steering apparatus.

BACKGROUND

Steer-by-wire steering apparatus are known, and generally comprise a hand wheel actuator which provides force feedback to a driver of the vehicle, and sense the driver's steering inputs, and a front axle actuator which moves the steering rack of the vehicle. The actuators are generally electric motors. There is no physical connection such as a steering column between the hand wheel and the steering rack.

Such motors require control signals. As the physical connection is lacking, it is important that there is redundancy in the operation of the motors. This can be achieved by "two-lane" systems, where there are independent circuits controlling either two separate motors in each location, or a single motor with two sets of coils. Thus, a failure in one circuit or motor will not mean that steering control of the vehicle is lost; losing steering control at speed could be dangerous.

An example of such a setup is shown in FIG. 1 of the accompanying drawings. In this example, a hand wheel actuator 1 is arranged to drive a hand wheel 2 based on signals from a hand wheel actuator controller 3. Likewise, a front axle actuator 4 is arranged to act on a steering rack 5 based on signals from front an axle actuator controller 6.

The hand wheel actuator controller 3 comprises a first microprocessor 7 and a second microprocessor 8. These represent independent lanes A and B, whereby the first 7 and second 8 microprocessors control either separate motors forming part of actuator 1 or separate coils in a single motor forming part of actuator 1.

The front axle actuator controller 6 comprises a first microprocessor 9 and a second microprocessor 10. These represent independent lanes A and B, whereby the first 9 and second 10 microprocessors control either separate motors forming part of actuator 4 or separate coils in a single motor forming part of actuator 4.

The two lanes of each controller 3, 6 communicate via private busses 11, 12. A first private bus 11 connects the first microprocessor 7 of lane A of the hand wheel actuator controller 3 to the first microprocessor 9 of lane A of the front axle actuator controller 6. A second private bus 12 connects the second microprocessor 8 of lane B of the hand wheel actuator controller 3 to the second microprocessor 10 of lane B of the front axle actuator controller 6.

The controllers 3, 6 can be connected to other components of the vehicle through supplemental busses 17, 18, 19, 20.

Both of the private busses 11, 12 use the CAN bus physical and data link layers and as such have CAN bus transceivers 13, 14, 15, 16. As such, the private busses are liable to common mode faults which will equally affect the identical private busses 11, 12.

SUMMARY

In accordance with a first aspect of the disclosure, there is provided a microprocessor system for a steer-by-wire steering apparatus for a vehicle, the microprocessor system comprising:

- a hand wheel actuator controller, comprising a first microprocessor and a second microprocessor, and arranged to provide control signals for a hand wheel actuator of the steering apparatus;
- a front axle actuator controller, comprising a first microprocessor and a second microprocessor, and arranged to provide control signals for a front axle actuator of the steering apparatus;
- a first private bus connecting the first microprocessor of the hand wheel actuator controller to the first microprocessor of the front axle actuator controller, the first private bus comprising a physical layer over which data can be transmitted with a first data link format and a second data link format different to the first data link layer format; and
- a second private bus connecting the second microprocessor of the hand wheel actuator controller to the second microprocessor of the front axle actuator controller, the second private bus comprising a physical layer over which data can be transmitted with the first data link format or the second data link format;
- in which the microprocessor system has:
- a first state in which the first private bus uses the first data layer format and the second private bus uses the second data layer format; and
- a second state where:
- the first private bus switches to use the second data layer format;
- the second private bus switches to use the first data layer format; or
- the first private bus switches to use the second data layer format and the second private bus switches to use the first data layer format;
- in which the microprocessor system is arranged to switch from the first state to the second state upon one of the first or second microprocessors of the hand wheel actuator controller or the front axle actuator controller determining that there is a fault on the first or second private bus.

This therefore provides a two-lane microprocessor system which has diversity of data link layers and can switch to alternative data link formats should a fault arise. As such, common faults which take out both private busses will less likely than if a common data link layer were used as the cause of the fault would need to interact deleteriously with diverse data link layer formats. If one private bus develops a fault, then it is likely to be reasonably safe to switch data link layer formats as the other data link layer format is likely to be unaffected by whatever caused the fault.

Typically, the first and second data layer formats are unrelated, in that they are not based on one another; this makes it less likely that a cause of a fault on one private bus will also affect the other private bus. As such, the first and second data layer formats will not typically comprise both CAN and FlexRay.

In one exemplary arrangement, the first data layer format is CAN and the second data layer format is UART.

In one exemplary arrangement, when a fault is detected, only one of the private busses switches data link layer format; this is so as to avoid using the data link layer format of the private bus which has developed the fault. However, for reasons of diversity, the microprocessor system may be arranged so as to switch the other of the private busses to the other data link layer format after a period of time has elapsed, in the hope that the problem that caused the fault is no longer occurring so as to ensure that the private busses are both using different data link layer formats.

The microprocessor system may be arranged to operate in the second state only for a period of time; this may represent a "limp home" function after which the driver of the vehicle will need to have the vehicle repaired. Typically, the period of time may be at least an hour or at least 30 minutes if the fault detected is either unknown or deemed to require immediate attention alternatively the limp home function may be retained for longer, for example up to 30 hours where the fault detected would be considered as less severe.

In accordance with a second aspect of the disclosure, there is provided an actuator controller for a steer-by-wire steering apparatus for a vehicle, the actuator controller being arranged to provide control signals for an actuator of the steering apparatus and comprising:

- a first microprocessor and a second microprocessor;
- a first transceiver for a first private bus connecting the first microprocessor to another actuator controller, the first private bus comprising a physical layer over which data can be transmitted, the transceiver being arranged to transmit data over the first private bus with a first data link format and a second data link format different to the first data link layer format; and
- a second transceiver for a second private bus connecting the second microprocessor to another actuator controller, the second private bus comprising a physical layer over which data can be transmitted and the second transceiver being arranged to transmit date over the second private bus with the first data link format or the second data link format;
- in which the actuator controller has:
- a first state in which the first transceiver uses the first data layer format and the second transceiver uses the second data layer format; and
- a second state where:
- the first transceiver switches to use the second data layer format;
- the second transceiver switches to use the first data layer format; or
- the first transceiver switches to use the second data layer format and the second transceiver switches to use the first data layer format;
- in which the actuator controller is arranged to switch from the first state to the second state upon one of the first or second microprocessors determining that there is a fault on the first or second private bus.

This therefore provides an actuator controller for a two-lane microprocessor system which has diversity of data link layers and can switch to alternative data link formats should a fault arise. As such, common faults which take out both private busses will less likely than if a common data link layer were used as the cause of the fault would need to interact deleteriously with diverse data link layer formats. If one private bus develops a fault, then it is likely to be reasonably safe to switch data link layer formats as the other data link layer format is likely to be unaffected by whatever caused the fault.

Typically, the first and second data layer formats are unrelated, in that they are not based on one another; this makes it less likely that a cause of a fault on one private bus will also affect the other private bus. As such, the first and second data layer formats will not typically comprise both CAN and FlexRay.

In one exemplary arrangement, the first data layer format is CAN and the second data layer format is UART.

In one exemplary arrangement, when a fault is detected, only one of the transceivers switches data link layer format; this is so as to avoid using the data link layer format of the private bus which has developed the fault. However, for reasons of diversity, the actuator controller may be arranged so as to switch the other transceiver to the other data link layer format after a period of time has elapsed, in the hope that the problem that caused the fault is no longer occurring so as to ensure that the private busses are both using different data link layer formats.

The actuator controller may be arranged to operate in the second state only for a period of time; this may represent a "limp home" function after which the driver of the vehicle will need to have the vehicle repaired. Typically, the period of time may be at least an hour or at least 30 minutes if the fault detected is either unknown or deemed to require immediate attention; alternatively the limp home function may be retained for longer, for example up to 30 hours where the fault detected would be considered as less severe.

The actuator controller may be a hand wheel actuator controller or a front wheel actuator controller.

In accordance with a third aspect of the disclosure, there is provided a method of operating a steer-by-wire steering apparatus for a vehicle comprising:

- a hand wheel actuator controller, comprising a first microprocessor and a second microprocessor, and arranged to provide control signals for a hand wheel actuator of the steering apparatus;
- a front axle actuator controller, comprising a first microprocessor and a second microprocessor, and arranged to provide control signals for a front axle actuator of the steering apparatus;
- a first private bus connecting the first microprocessor of the hand wheel actuator controller to the first microprocessor of the front axle actuator controller, the first private bus comprising a physical layer over which data can be transmitted with a first data link format and a second data link format different to the first data link layer format; and
- a second private bus connecting the second microprocessor of the hand wheel actuator controller to the second microprocessor of the front axle actuator controller, the second private bus comprising a physical layer over which data can be transmitted with the first data link format or the second data link format;
- the method comprising:
- in a first operating mode, transmitting data over the first private bus with the first data layer format and over the second private bus with the second data layer format; and
- in a second operating mode:
- switching to transmit data over the first private bus using the second data layer format;
- switching to transmit data over the second private bus using the first data layer format; or
- switching to transmit data over the first private bus using the second data layer format and over the second private bus using the first data layer format;

wherein switching from the first operating mode to the second operating mode occurs upon one of the first or second microprocessors of the hand wheel actuator controller or the front axle actuator controller determining that there is a fault on the first or second private bus.

This therefore provides the operation of a two-lane microprocessor system which has diversity of data link layers and can switch to alternative data link formats should a fault arise. As such, common faults which take out both private busses will less likely than if a common data link layer were used as the cause of the fault would need to interact deleteriously with diverse data link layer formats. If one private bus develops a fault, then it is likely to be reasonably safe to switch data link layer formats as the other data link layer format is likely to be unaffected by whatever caused the fault.

Typically, the first and second data layer formats are unrelated, in that they are not based on one another; this makes it less likely that a cause of a fault on one private bus will also affect the other private bus. As such, the first and second data layer formats will not typically comprise both CAN and FlexRay.

In one exemplary arrangement, the first data layer format is CAN and the second data layer format is UART.

In one exemplary arrangement, when a fault is detected, only one of the private busses switches data link layer format; this is so as to avoid using the data link layer format of the private bus which has developed the fault. However, for reasons of diversity, the method may switch the other of the private busses to the other data link layer format after a period of time has elapsed, in the hope that the problem that caused the fault is no longer occurring so as to ensure that the private busses are both using different data link layer formats.

The method may comprise operating in the second state only for a period of time; this may represent a "limp home" function after which the driver of the vehicle will need to have the vehicle repaired. Typically, the period of time may be at least an hour or at least 30 minutes if the fault detected is either unknown or deemed to require immediate attention; alternatively the limp home function may be retained for longer, for example up to 30 hours where the fault detected would be considered as less severe.

BRIEF DESCRIPTION OF DRAWINGS

There now follows, by way of example only, description of an exemplary arrangement of the disclosure, described with reference to the accompanying drawings, in which.

DETAILED DESCRIPTION

Figure 1:
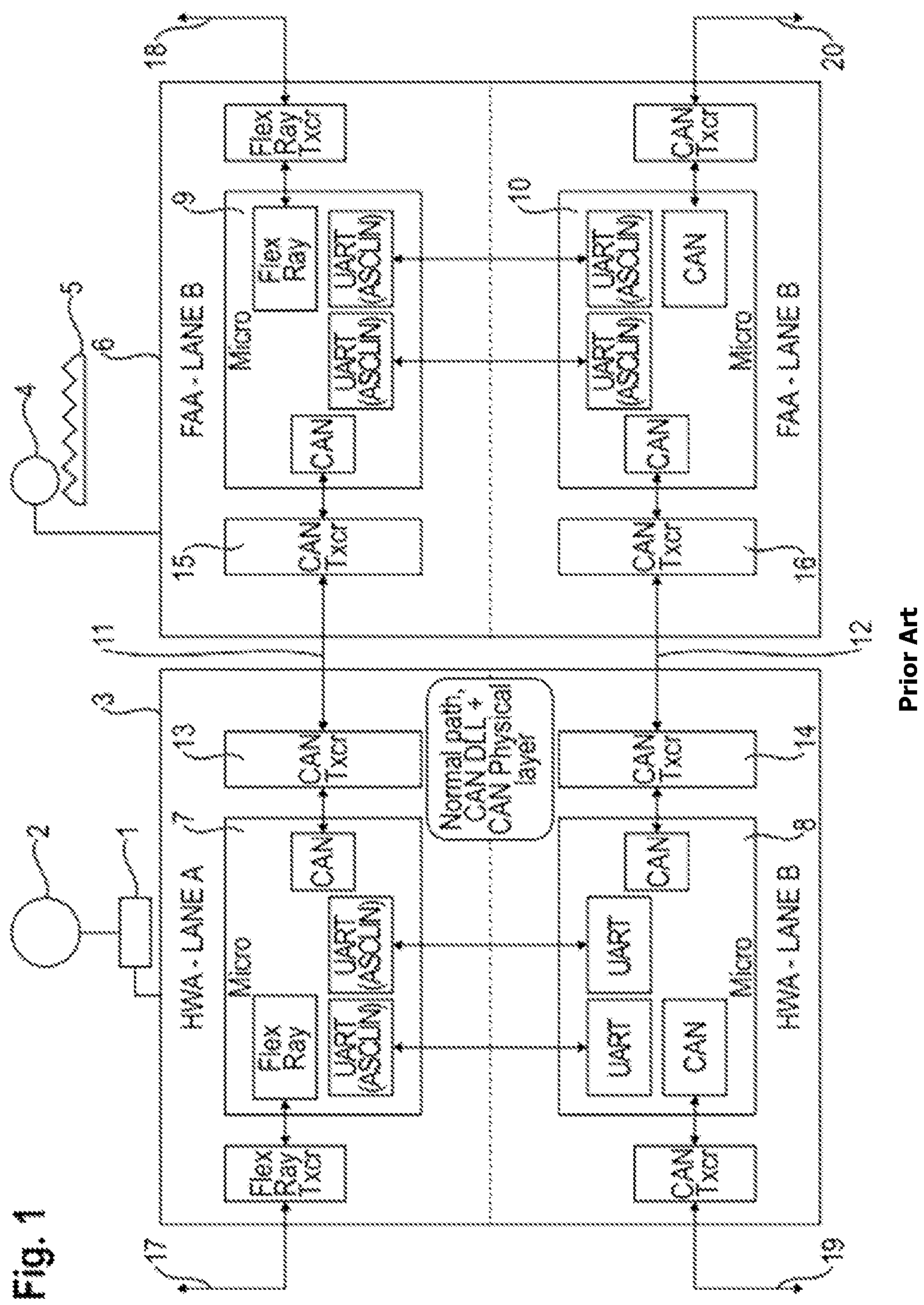
FIG. 1 shows schematically a two-lane microprocessor system for controlling a steer by wire system of a vehicle, not in accordance with the claimed disclosure.
Figure 2:
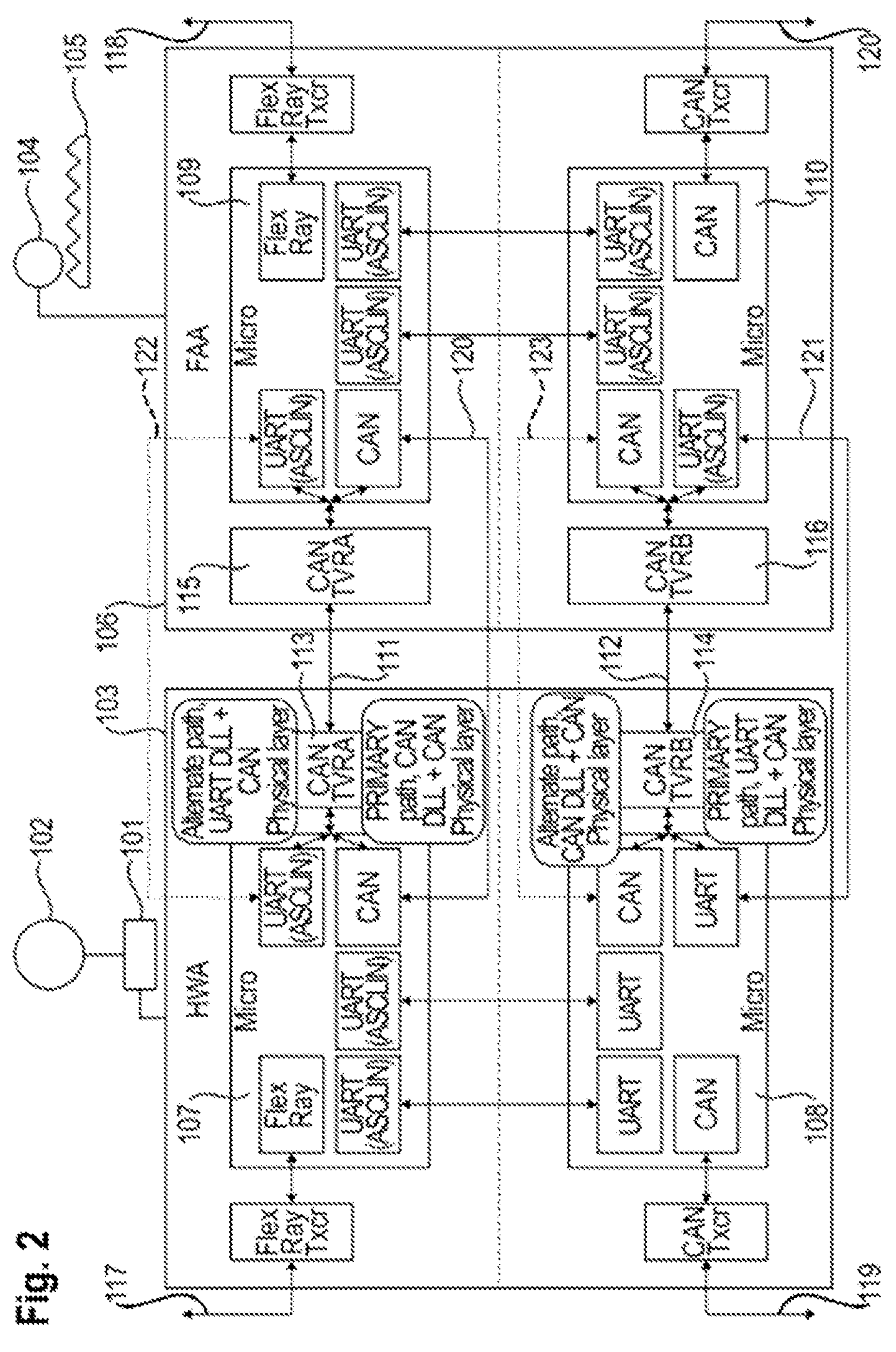
FIG. 2 shows schematically a two-lane microprocessor system for controlling a steer by wire system of a vehicle.

FIG. 2 of the accompanying drawings depicts a two-lane microprocessor system in accordance with an exemplary arrangement of the present disclosure. Corresponding features to those of the arrangement of FIG. 1 are referred to with the same reference numerals, raised by 100.

In this example, the hand wheel actuator 101 is arranged to drive the hand wheel 102 based on signals from hand wheel actuator controller 103. Likewise, the front axle actuator 104 is arranged to act on steering rack 105 based on signals from front axle actuator controller 106.

The hand wheel actuator controller 103 comprises a first microprocessor 107 and a second microprocessor 108. These represent independent lanes A and B, whereby the first 107 and second 108 microprocessors control either separate motors forming part of actuator 1 or separate coils in a single motor forming part of actuator 101.

The front axle actuator controller 106 comprises a first microprocessor 109 and a second microprocessor 110. These represent independent lanes A and B, whereby the first 109 and second 110 microprocessors control either separate motors forming part of actuator 104 or separate coils in a single motor forming part of actuator 104.

The two lanes of each controller 103, 106 communicate via private busses 111, 112. A first private bus 111 connects the first microprocessor 107 of lane A of the hand wheel actuator controller 103 to the first microprocessor 109 of lane A of the front axle actuator controller 116. A second private bus 112 connects the second microprocessor 108 of lane B of the hand wheel actuator controller 103 to the second microprocessor 110 of lane B of the front axle actuator controller 106.

The private busses 111, 112 share a common physical layer, but can have differing data link layers. Each private bus 111, 112 has a primary data link layer 120, 121 indicated in FIG. 2 in solid links and a backup data link layer 122, 123 shown in dotted lines. Transceivers 113, 114, 115, 116 transmit data over the physical link layers, but can use either data link layer 120, 121, 122, 123.

The format of the primary data link layer 120 connecting the first microprocessors 107, 109 is the same as the format of the secondary data link layer 123 connecting the second microprocessors 109, 110, and in this exemplary arrangement is CAN bus. Likewise, the format of the secondary data link layer 122 connecting the first microprocessors 107, 109 is different to that discussed in the preceding sentence and is the same as the format of the primary data link layer 121 connecting the second microprocessors 109, 110, and in this exemplary arrangement is UART.

In normal use, both of the primary data link layers 120, 121 are in use, such that the first private bus 111—lane A—uses CAN bus as its data link layer whereas the second private bus 112—lane B—uses UART. This avoids the case where the data link layers are related, such as CAN and FlexRay, which both originated with the same company.

As such, this means that there is diversity in the data link layer formats used for the two different lanes, and as such, it is less likely that a common mode fault will occur.

If a fault is detected by one of the microprocessors 107, 108, 109, 110 (e.g. no response to a signal sent to a communicating microprocessor) then the microprocessors are arranged to switch at least one of the private busses from the primary data link layer formats 120, 121 to the second data link layer format 122, 123. Initially, only the faulty link will switch to the secondary data link layer format, so as to avoid whatever has caused the fault. However, for reasons of diversity, the microprocessors 107, 108, 109, 110 may be arranged so as to switch the other of the private busses to the other data link layer format after a period of time has elapsed, in the hope that the problem that caused the fault is no longer occurring so as to ensure that the private busses are both using different data link layer formats.

The microprocessors 107, 108, 109, 110 may be arranged to operate using the secondary data link layer formats for a period of time; this may represent a "limp home" function after which the driver of the vehicle will need to have the vehicle repaired. Typically, the period of time may be at least an hour or at least 30 minutes if the fault detected is either unknown or deemed to require immediate attention alternatively the limp home function may be retained for longer, for example up to 30 hours where the fault detected would be considered as less severe.

The controllers 103, 106 can be connected to other components of the vehicle through supplemental busses 117, 118, 119, 120.

The invention claimed is:

1. A microprocessor system for a steer-by-wire steering apparatus for a vehicle, the microprocessor system comprising:

a hand wheel actuator controller, comprising a first hand wheel microprocessor and a second hand wheel microprocessor, and arranged to provide control signals for a hand wheel actuator of the steering apparatus, a front axle actuator controller, comprising a first front axle microprocessor and a second front axle microprocessor, and arranged to provide control signals for a front axle actuator of the steering apparatus;

a first private bus connecting the first hand wheel microprocessor to the first front axle microprocessor, the first private bus comprising a physical layer over which data can be transmitted using a first data link layer format and a second data link layer format different from the first data link layer format; and a second private bus connecting the second hand wheel microprocessor to the second front axle microprocessor, the second private bus comprising a physical layer over which data can be transmitted using the the first data link layer format or the second data link layer format;

wherein the microprocessor system has:

a first state in which the first private bus uses the first data link layer format and the second private bus uses the second data link layer format; and a second state wherein at least one of:

the first private bus switches to use the second data link layer format; or the second private bus switches to use the first data link layer format;

wherein the microprocessor system is arranged to switch from the first state to the second state upon one of the first or second hand wheel microprocessors or the first or second front axle microprocessors determining that there is a fault on the first private bus or the second private bus.

2. The microprocessor system of claim 1, in which, when a fault is detected, only one of the private busses switches data link layer format.

3. The microprocessor system of claim 2, arranged so as to switch the other one of the first private bus or the second private bus to the data link layer format not currently used by that bus after a predetermined period of time has elapsed.

4. The microprocessor system of claim 1, in which the first and second data layer formats are unrelated.

5. The microprocessor system of claim 1, in which the first and second data layer formats do not comprise both CAN and FlexRay.

6. The microprocessor system of claim 1, in which the first data layer format is CAN and the second data layer format is UART.

7. The microprocessor system of claim 1, wherein the microprocessor system is arranged to operate in the second state only for a period of time.

8. An actuator controller for a steer-by-wire steering apparatus for a vehicle, the actuator controller being arranged to provide control signals for an actuator of the steering apparatus and comprising:

a first microprocessor and a second microprocessor;

a first transceiver for a first private bus connecting the first microprocessor to another actuator controller, the first private bus comprising a physical layer over which data can be transmitted, the first transceiver being arranged to transmit data over the first private bus with a first data link layer format and a second data link layer format different from the first data link layer format; and a second transceiver for a second private bus connecting the second microprocessor to another actuator controller, the second private bus comprising a physical layer over which data can be transmitted and the second transceiver being arranged to transmit data over the second private bus with the first data link layer format or the second data link layer format;

wherein the actuator controller has:

a first state in which the first transceiver uses the first data layer format and the second transceiver uses the second data layer format; and a second state where:

the first transceiver switches to use the second data layer format;

the second transceiver switches to use the first data layer format; or the first transceiver switches to use the second data layer format and the second transceiver switches to use the first data layer format;

in which the actuator controller is arranged to switch from the first state to the second state upon one of the first or second microprocessors determining that there is a fault on the first or second private bus.

9. A method of operating a steer-by-wire steering apparatus for a vehicle comprising:

providing a hand wheel actuator controller, comprising a first microprocessor and a second microprocessor, and arranged to provide control signals for a hand wheel actuator of the steering apparatus;

providing a front axle actuator controller, comprising a first microprocessor and a second microprocessor, and arranged to provide control signals for a front axle actuator of the steering apparatus;

providing a first private bus connecting the first microprocessor of the hand wheel actuator controller to the first microprocessor of the front axle actuator controller, the first private bus comprising a physical layer over which data can be transmitted with a first data link format and a second data link format different to the first data link layer format; and providing a second private bus connecting the second microprocessor of the hand wheel actuator controller to the second microprocessor of the front axle actuator controller, the second private bus comprising a physical layer over which data can be transmitted with the first data link format or the second data link format;

the method comprising:

in a first operating mode, transmitting data over the first private bus with the first data layer format and over the second private bus with the second data layer format; and in a second operating mode:

switching to transmit data over the first private bus using the second data layer format;

switching to transmit data over the second private bus using the first data layer format; or switching to transmit data over the first private bus using the second data layer format and over the second private bus using the first data layer format;

wherein switching from the first operating mode to the second operating mode occurs upon one of the first or second microprocessors of the hand wheel actuator controller or the front axle actuator controller determining that there is a fault on the first or second private bus.

10. The method of claim 9, in which, when a fault is detected, only one of the private busses switches data link layer format.

11. The method of claim 10, comprising switching the other one of the first private busses or the second private bus to the data link layer format not currently used by that bus after a predetermined period of time has elapsed.

12. The method of claim 11, comprising operating in the second state only for a period of time.

13. The method of claim 9, in which the first and second data layer formats do not comprise both CAN and FlexRay.

14. The method of claim 13, in which the first data layer format is CAN and the second data layer format is UART.

15. The method of claim 14, in which, when a fault is detected, only one of the private busses switches data link layer format.

16. The method of claim 9, in which the first and second data layer formats are unrelated.

17. The method of claim 9, in which the first data layer format is CAN and the second data layer format is UART.

* * * * *